June 6, 1967  J. A. KILBANE, JR  3,323,650
MARINE CHLORINATOR
Filed Dec. 4, 1964  2 Sheets-Sheet 1
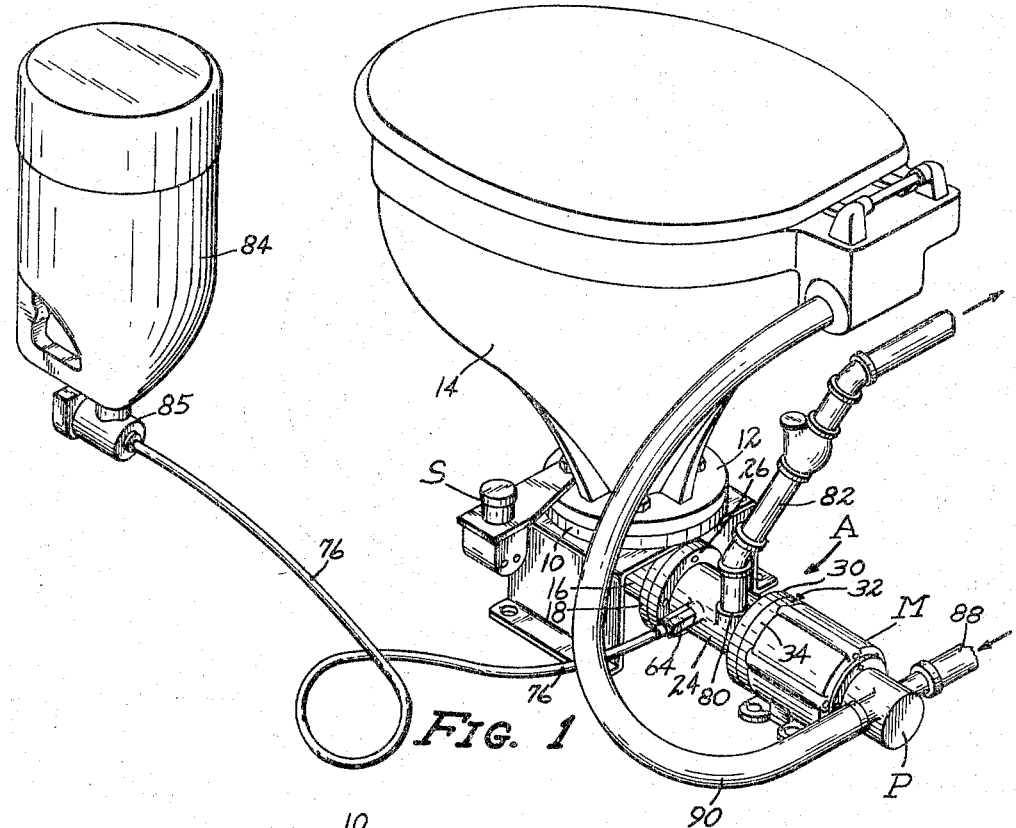
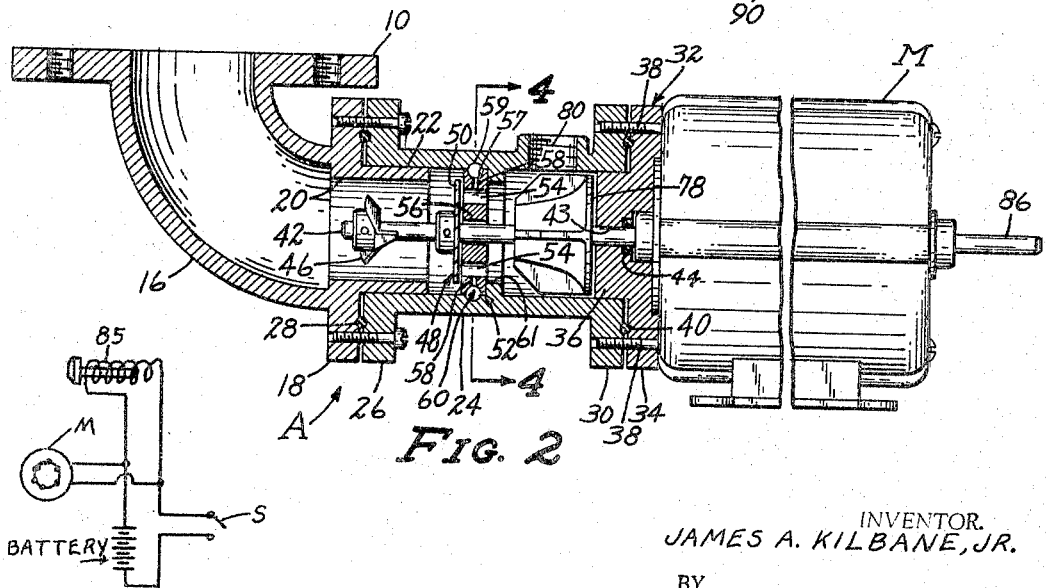
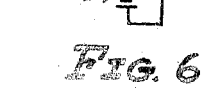
INVENTOR.
JAMES A. KILBANE, JR.
BY
Caswell, Layard & Wicks
ATTORNEYS

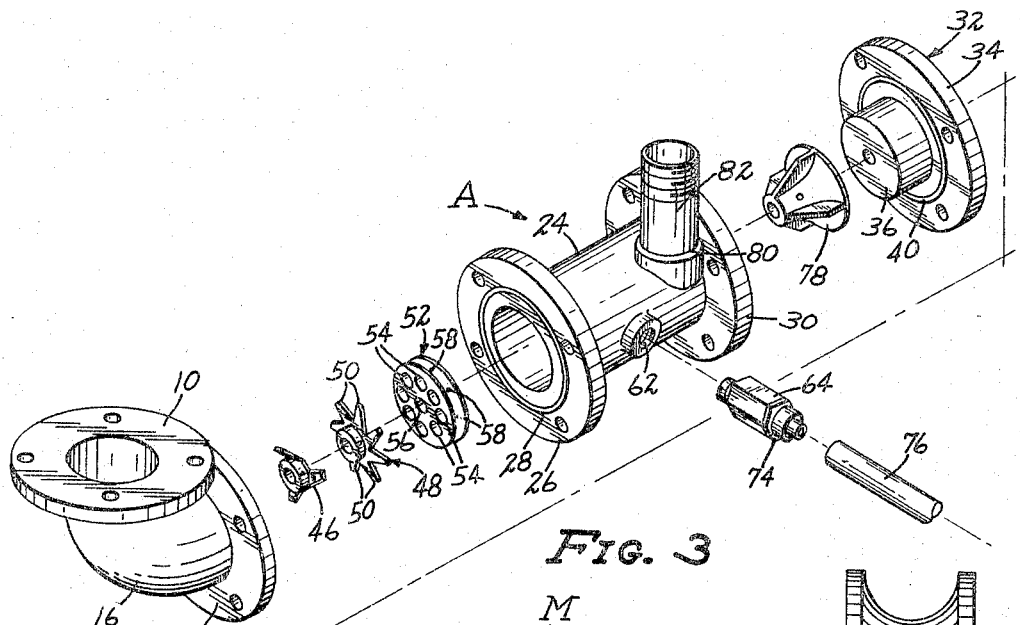
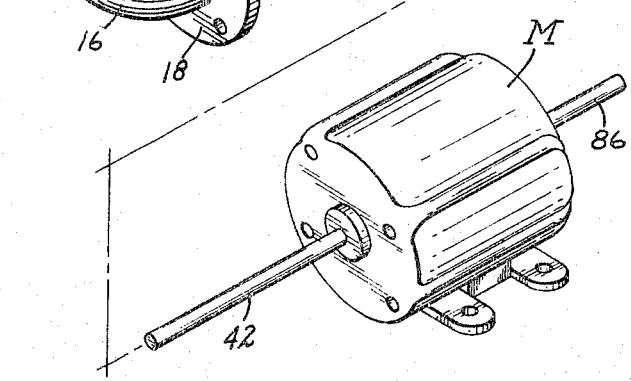
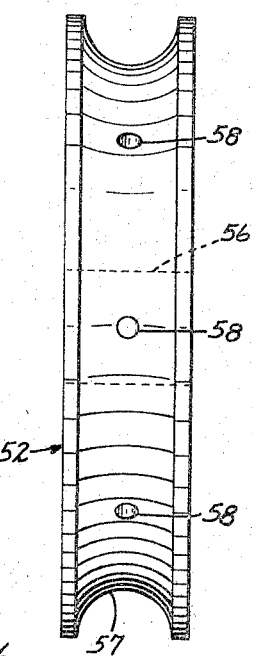
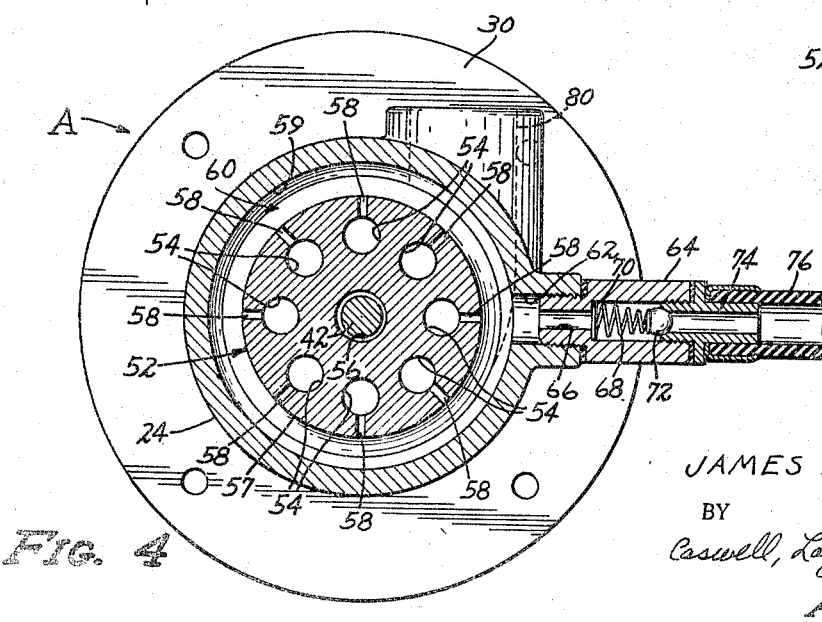
INVENTOR.
JAMES A. KILBANE, JR.
BY
Caswell, Legaard & Wicks
ATTORNEYS

United States Patent Office 3,323,650
Patented June 6, 1967

3,323,650
MARINE CHLORINATOR
James A. Kilbane, Jr., Box 571, Rte. 1,
Excelsior, Minn. 55331
Filed Dec. 4, 1964, Ser. No. 416,061
5 Claims. (Cl. 210—152)

The invention relates to an improvement in a device for intimately commingling one material with another material such as chlorine and human feces to thereby reduce the bacterial count to the minimum required for discharge of the feces from a marine toilet or the like.

In recent years the number of boats in use, for example, has increased to a point where the sewage discharged therefrom into the water such as lakes, rivers and protected bays must be treated before a deposit of the same. The problem is to treat the sewage with a bacterial killing substance which treatment must be done rapidly and extremely thoroughly before discharge.

It has been found that fecal matter enters a toilet bowl with a coliform population running into the billions per hundred cubic centimeters. Some state laws require that the coliform concentration be reduced to less than 500 coliform per hundred cubic centimeters. With applicant's device the count has been reduced to an average of less than 30 coliforms per hundred cubic centimeters in a series of tests made, some of the tests being zero.

It is an object of the invention to provide a chlorinator which thoroughly macerates the human feces combined with flush water and which mingles and intimately treats the feces and water mixture with chlorine or the like whereby the greatest total area of fecal matter is treated. It is a further object to provide a chlorinator which macerates human feces and then treats the feces in the macerated condition with chlorine or the like to a degree with a speed hitherto unattained.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the marine chlorinator attached to a toilet bowl and embodying the invention.

FIGURE 2 is a longitudinal sectional view through the chlorinator without the chlorine supply means and the water pump.

FIGURE 3 is an exploded perspective view of the chlorinator and showing a portion of the chlorine supply line.

FIGURE 4 is a sectional view on the line 4—4 of FIGURE 2.

FIGURE 5 is an edge view of the orifice plate.

FIGURE 6 is a diagram of the circuit used in operating the device.

Referring to the drawings in detail, the chlorinating unit A includes the circular flange portion 10 which is bolted to the flange 12 of the toilet bowl 14. Extending downwardly from and forming part of the flange 10 is the tubular elbow portion 16 which terminates in the circular flange portion 18 and extending from the opening 20 of the flange portion 18 is the tubular extension portion 22. Further provided is the tubular housing 24 which has formed on the inner end thereof the annular flange 26. The flange 26 is bolted to the flange 18 with the extension 22 positioned within the tubular housing 24 and an O-ring 28 positioned between the opposed faces of the flanges to provide additional seal.

The outer end of said housing is formed with the annular flange 30. The numeral 32 designates a base support member motor adapter formed with the circular base portion 34, and formed axially therewith is the circular extension portion 36. The flange 30 and adapter 32 are connected to the motor M by means of the bolts 38 with sealing engagement between flages 30 and 34 aided by means of the O-ring 40. The extension portion 36 fits within the housing 24. The motor shaft 42 of the motor M extends through an axial hole 42 formed in the adapter 32 with sealing engagement effected by the O-ring 44.

Mounted on the outer end of the shaft 42 and adjacent the flange 18 is the macerating blade 46 which cuts up the fecal matter as it comes from the elbow portion 16. Also mounted on the shaft 42 and spaced from the macerating blade 46 is the second macerating or chopper blade 48 formed with a plurality of radially extending spaced blade portions 50. The blade 48 cuts up any solids not cut up by the blade 46 thereby producing a liquid mixture of fecal matter and water for flow through the body member 52 in the form of an orifice plate. The orifice plate 52 is circular in formation and has formed therethrough a plurality of spaced flow holes 54 adjacent to but spaced from the outer periphery of the plate. A liquid coming to the plate 52 is forced to pass through the flow holes 54 wherein the liquid in effect is concentrated and collected for treatment.

The orifice plate 52 is also formed with the axial hole 56 through which the shaft 42 freely extends. The outer annular edge of the orifice plate 52 is formed with the recess 57 extending entirely around the periphery and extending radially and outwardly from each of the holes 54 to the recess 57 is a short orifice 58. The inner surface of the housing 24 is formed with an annular recess 59 which is in radial alignment with annular recess 57 of plate 52 to form a complete recess 60 thereby providing an annular conduit. The orifice plate 52 is press fit within the housing 24 in abutment with the annular shoulder 61 formed internally of the housing 24.

Formed on the housing 24 is the chlorine solution inlet hole 62 in which is threadedly engaged the check valve housing 64 formed with the outlet hole 66. Mounted within the check valve housing 64 is the coil spring 68 positioned upon the shoulder 70 and against the ball 72, the ball 72 being adjustably positioned upon the weak spring 68 by means of the tubular retainer 74 threadedly engaged with the check valve housing 64. Secured to the retainer 74 is the chlorine solution supply line 76.

The inlet hole 62 of the housing 24 is directly in radial alignment with the annular recess 57 of the orifice plate 52 and recess 59 of the housing 24 whereby chlorine solution coming from supply line 76 is directed directly into the recess 60 made up of recess 57 and 59 where it performs as hereinafter explained.

The numeral 78 designates an impeller which is secured upon the shaft 42 between the orifice plates 52 and the extension hub portion 36 of the motor adapter member 32. Formed in the housing 24 is the outlet opening 80 which is radially in line with the impeller 78 and to which is attached the discharge line 82 which, in the case of a boat, leads outwardly of the hull. The rotative action of the impeller 78 by means of the motor M draws sewage from the bowl 14 downwardly through the elbow 16 from which it is directed to the macerators 46 and 48, through the flow holes 54 of orifice plate 52 and through the housing 24 and out the discharge hole 80.

A supply of chlorine solution is maintained in the container 84 and secured within the neck of the bottom of the container is a solenoid valve 85 which is actuated by the switch S which allows solution to pass from the container to the supply line 76. The switch simultaneously operates the motor M and also the conventional water pump P mounted on the shaft 86 of motor M. The pump P pumps fresh water from the first supply line 88 to the second supply line 90 connected to the bowl 14.

When the solids of the sewage strikes the blade 46 the same are broken up into small pieces. The remaining small pieces mixed with water are further broken up by the macerator blade 48 into very fine particles which completes the maceration and presents a large area of the solids for chlorinating which are drawn through the flow holes 54 of plate 52. The mixture of sewage and water is substantially a liquid. When the fine particles making up the sewage and water mixture pass through the holes 54, the same are in a completely and finely macerated condition and mix with a chlorine solution from each of the orifices 58. The treating of the sewage is thus positive at a point where the same is broken into fine particles and completely macerated thus presenting a large area for mixing and absorption of and intimate contact with the chlorine solution.

As stated, the impeller 78 draws a fecal matter and water mixture through the housing and holes of the orifice plate 52, and the velocity of the fecal matter through the holes 54 creates an aspiration effect which draws chlorine solution from supply line 76 to the annular recess 60 and into the holes 54 via the orifices 58 where it treats the fecal matter. The aspiration created opens the check valve ball 72 and draws solution from line 76. When the switch S is shut off and the impeller stops, then the check ball 72 goes back upon its seat due to lack of a negative pressure or aspiration in the area of the orifice plate 52. As a result, solution cannot drain from supply line 76. When the switch S is released, the motor M stops thus stopping the impeller 78 and pump P and also the aspiration of chlorinating solution as set out above.

It will be seen that the mixing of the fecal matter with the solution is at a point where the fecal matter is completely macerated into extremely fine particles substantially in liquid form thereby presenting the greatest possible area of fecal matter exposed for treatment by contact and mixing with the solution.

The elbow 16 can be made dual and receive fecal matter from a second bowl remote from bowl 14. In addition, the construction herein disclosed may receive various fluid materials and mix another material or materials with it in the same manner. In mixing fluid materials by means of the construction disclosed, the need for mixing container is done away with.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A device for treating sewage comprising:
    (a) a cylindrical housing extending along a longitudinal axis,
    (b) means for directing sewage from a toilet bowl to said housing,
    (c) a shaft extending axially through said housing,
    (d) a first mascerating blade mounted on said shaft adjacent said sewage directing means,
    (e) a second macerating blade mounted on said shaft spaced from said first blade,
    (f) an orifice plate positioned within said housing normal to the longitudinal axis of said housing adjacent said second blade and through which said shaft freely extends,
    (g) an impeller mounted on said shaft for rotation therewith,
    (h) said housing having a discharge opening formed therein in radial alignment with said impeller,
    (i) said housing having an inlet opening for a supply line carrying chlorine solution formed therein in radial alignment with said orifice plate,
    (j) said orifice plate having a plurality of flow holes formed therethrough and
    (k) the outer periphery of said orifice plate formed with a recess communicating with said inlet opening,
    (l) said orifice plate having an orifice leading from said peripheral recess to each of said flow holes thereof,
    (m) means for rotating said shaft to cause said impeller to draw sewage macerated by said blades through said flow holes of said orifice plate and draw a chlorine solution through said orifices from said peripheral recess to intimately contact and mix with the sewage in and about said flow holes for treatment thereby and discharge through said discharge opening of said housing.

2. A device for treating sewage comprising:
    (a) a cylindrical housing extending along a longitudinal axis,
    (b) means for directing sewage from a toilet bowl to said housing,
    (c) a shaft extending axially through said housing,
    (d) sewage macerating means mounted on said shaft adjacent said sewage directing means,
    (e) an orifice plate positioned within said housing normal to the longitudinal axis of said housing adjacent said macerating means and through which said shaft freely extends,
    (f) an impeller mounted on said shaft for rotation therewith,
    (g) said housing having a discharge opening formed therein in radial alignment with said impeller,
    (h) said housing having an inlet opening for a supply line carrying chlorine solution formed therein in radial alignment with said orifice plate,
    (i) said orifice plate having a plurality of flow holes formed therethrough and
    (j) the outer periphery of said orifice plate formed with a recess communicating with said inlet opening,
    (k) said orifice plate having an orifice leading from said orifice plate recess to each of said flow holes thereof,
    (l) means for rotating said shaft to cause said impeller to draw sewage macerated by said macerating means through said flow holes of said orifice plate and draw a chlorine solution through said orifices from said peripheral recess to mix with and intimately contact sewage in and about said flow holes for treatment thereby and discharge through said discharge opening of said housing.

3. A device for mixing one liquid with another liquid comprising:
    (a) a housing extending along a longitudinal axis,
    (b) means for directing a first liquid material from a container to said housing,
    (c) a shaft extending axially through said housing,
    (d) a macerating blade mounted on said shaft adjacent said liquid directing means,
    (e) an orifice plate positioned within said housing normal to the longitudinal axis of said housing and through which said shaft freely extends,
    (f) a discharge opening formed on said housing,
    (g) said housing having an inlet opening for a supply line of a second liquid in radial alignment with said orifice plate,
    (h) said orifice plate having a plurality of flow holes formed therethrough and
    (i) the outer periphery of said orifice plate formed with a recess communicating with said inlet opening,
    (j) said orifice plate having an orifice leading from said recess of said plate to each of said flow holes thereof, (k) means for rotating said shaft to cause said macerating blade to agitate said first liquid, and (l) means for moving a first liquid through said flow holes of said orifice plate and a second liquid through said orifices from said peripheral recess to intimately mix the first and second liquids and discharge the mixed liquids out said discharge opening.

4. A device for mixing one liquid with another comprising:
(a) a housing extending along a longitudinal axis,
(b) means for directing a first liquid material from a container to said housing,
(c) a shaft extending axially through said housing,
(d) a macerating blade mounted on said shaft adjacent said liquid directing means,
(e) an impeller mounted on said shaft for rotation therewith,
(f) a discharge opening formed on said housing in radial alignment with said impeller,
(g) means positioned within said housing having a plurality of flow holes extending longitudinally of said housing,
(h) said housing having an inlet opening for a supply line of a second liquid in radial alignment with said flow holes,
(i) said housing having an annular recess formed internally thereof in radial alignment with said inlet opening,
(j) each of said flow holes communicating with said annular recess of said housing by means of an orifice,
(k) means for rotating said shaft to cause said impeller to draw the first liquid to and through said flow holes and the second liquid through said orifices from said annular recess to intimately mix said first and second liquids in and about said flow holes and discharge through said discharge opening.

5. A device for mixing one liquid with another liquid comprising:
(a) a housing extending along a longitudinal axis,
(b) means for directing a first liquid material from a container to said housing,
(c) a shaft extending axially through said housing,
(d) a macerating blade mounted on said shaft adjacent said liquid directing means,
(e) an orifice plate positioned within said housing normal to the longitudinal axis of said housing and through which said shaft freely extends,
(f) a discharge opening formed on said housing,
(g) said housing having an inlet opening for a supply line of a second liquid in radial alignment with said orifice plate,
(h) said orifice plate having a plurality of flow holes formed therethrough,
(i) annular conduit means carried by said housing and in radial alignment with said inlet opening,
(j) each of said flow holes communicating with said annular conduit means by means of an orifice,
(k) means for rotating said shaft to cause said macerating blade to agitate said first liquid, and
(l) means for moving a first liquid through said flow holes of said orifice plate and a second liquid through said orifices from said annular conduit means to intimately mix the first and second liquids and discharge the mixed liquids out said discharge opening.

References Cited

UNITED STATES PATENTS

| | | | |
|---|---|---|---|
| 2,307,509 | 1/1943 | Joachim et al. | 259—4 |
| 2,815,532 | 12/1957 | Braunlich | 259—4 X |
| 3,064,680 | 11/1962 | Winslow | 261—75 X |
| 3,094,707 | 6/1963 | Fleming | 4—90 X |
| 3,124,810 | 3/1964 | Cobler | 4—90 |
| 3,195,149 | 7/1965 | Carlson | 259—8 X |
| 3,228,036 | 1/1966 | Zaske et al. | 259—8 X |

FOREIGN PATENTS

| | | |
|---|---|---|
| 121,791 | 8/1946 | Australia. |
| 1,072,610 | 3/1954 | France. |
| 1,093,157 | 11/1954 | France. |
| 585,553 | 2/1947 | Great Britain. |

REUBEN FRIEDMAN, *Primary Examiner.*

SAMUEL FEINBERG, *Examiner.*

D. M. RIESS, *Assistant Examiner.*